4 Sheets—Sheet 1.

S. WILCOX.

HOT AIR ENGINE.

No. 10,486. Reissued June 3, 1884.

WITNESSES—

Charles R. Searle,
J. E. Reinwee

INVENTOR—

Stephen Wilcox
by his attorney
Thomas D. Stetson

THE ECKERT LITHOGRAPHING CO.: WASHINGTON, D. C.

4 Sheets—Sheet 2.

S. WILCOX.

HOT AIR ENGINE.

No. 10,486. Reissued June 3, 1884.

WITNESSES—

Charles R. Searle.
J. E. Renwick.

INVENTOR—

Stephen Wilcox
by his Attorney
Thomas D. Stetson.

THE ECKERT LITHOGRAPHING CO., WASHINGTON, D. C.

S. WILCOX.

HOT AIR ENGINE.

No. 10,486. Reissued June 3, 1884.

WITNESSES—

Charles R. Searle.
S. E. Renwee

INVENTOR—

Stephen Wilcox
by his attorney
Thomas D. Stetson

THE ECKERT LITHOGRAPHING CO., WASHINGTON, D. C.

S. WILCOX.

HOT AIR ENGINE.

No. 10,486. Reissued June 3, 1884.

WITNESSES—

Charles R. Searle,
S. E. Renwick

INVENTOR—

Stephen Wilcox,
by his Attorney
Thomas D. Stetson

THE ECKERT LITHOGRAPHING CO., WASHINGTON, D. C.

UNITED STATES PATENT OFFICE.

STEPHEN WILCOX, OF BROOKLYN, NEW YORK.

HOT-AIR ENGINE.

SPECIFICATION forming part of Reissued Letters Patent No. 10,486, dated June 3, 1884.

Original No. 289,482, dated December 4, 1883. Application for reissue filed April 17, 1884.

*To all whom it may concern:*

Be it known that I, STEPHEN WILCOX, of Brooklyn, in the county of Kings and State of New York, and doing business in the city of New York, same State, have invented certain new and useful Improvements in Hot-Air Engines, of which the following is a specification.

The invention relates to details of construction as fully set forth below.

The accompanying drawings form a part of this specification, and represent what I consider the best means of carrying out the invention.

Figure 1:
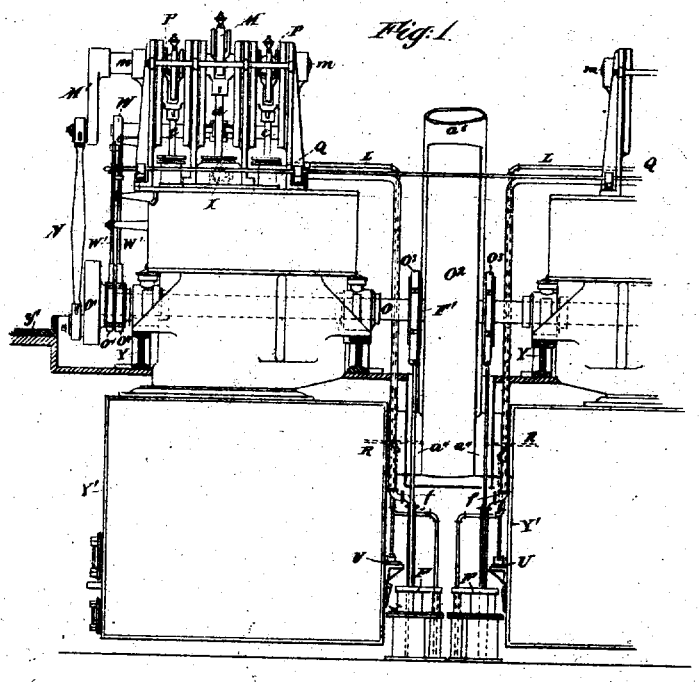
Figure 2:
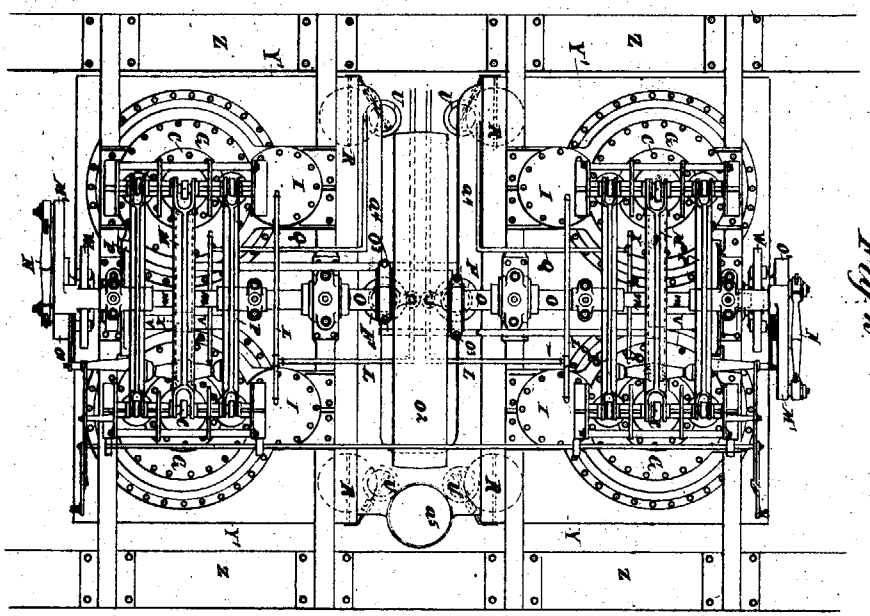
Figure 3:
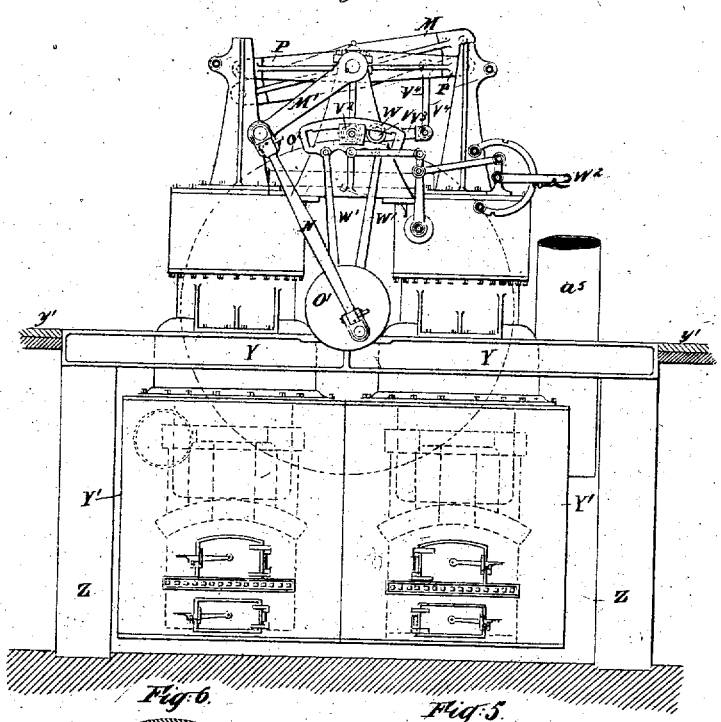
Figure 6:
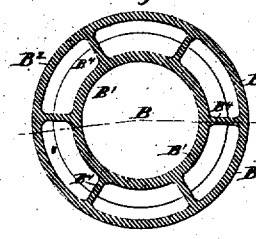
Figure 5:
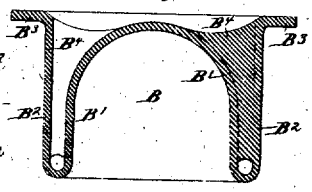
Figure 4:
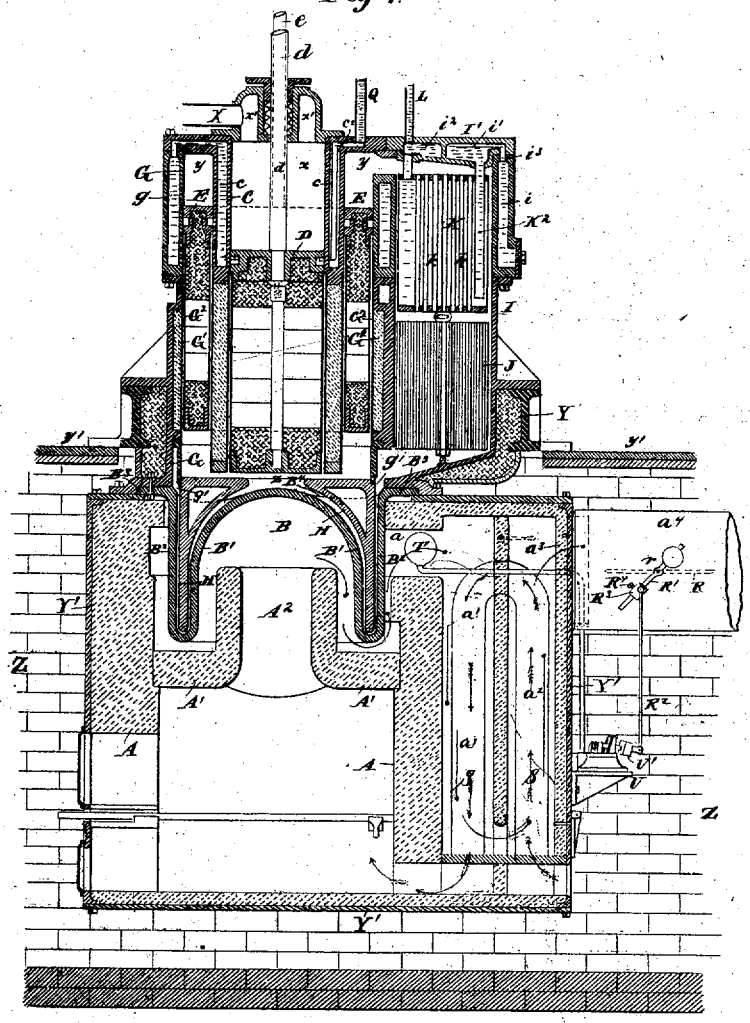

Figure 1 is an end elevation of the engines constituting one half of the complete set of apparatus. Fig. 2 is a corresponding plan view, showing also the adjacent engines constituting the other half of the combined set. Fig. 3 is a side elevation of the pair of compound cylinders and directly connected parts constituting one engine. Fig. 4 is on a larger scale. It is a vertical section through the main portions of one of the compound cylinders and the immediately connected parts. Fig. 5 is a vertical section of a portion on a larger scale. Fig. 6 is a corresponding horizontal section.

Similar letters of reference indicate corresponding parts in all the figures.

My improved engine has upright cylinders peculiarly compounded. Each has two deep pistons, having tight-fitting packings in their upper portions only and running free in their lower portions, with a heater and furnace still lower. Each cylinder is compound, there being in each case a smaller cylinder within a larger. These compound cylinders are coupled in twos to form one engine. Two of these engines or pairs of compound cylinders are united to work together on one shaft.

I will first describe one of the compound cylinders and its immediate connections.

In the figures, A is the brick-work of the furnace, and $A^2$ a fire-brick funnel extending upward a little from an arch, A′, in the top of the furnace, and causing the hot gases therefrom to be projected directly into the top of the dome-like heater above.

C is the interior cylinder. Its upper part is of cast-iron, made of two thicknesses. Between the outer and inner thicknesses is an annular chamber, *c*, in which water is circulated, as will be presently described. The upper portion of this part of the cylinder C is nicely finished on both its inner and outer faces, *s*. It is finished on its inner face to form a tight contact with the working piston D by the aid of Dunbar packing or other suitable packing in the piston. It is finished on its outer face to form a tight contact by the aid of packing, with an annular changing piston, E. The lower portion of this cylinder C is also double. It is made of sheet-iron or other thin material secured to the rigid part above by riveting or otherwise, as plainly indicated in Fig. 4. The interior is filled with plaster, so as to form a strong and stiff support to the metal. It serves also as a good non-conductor. There is a space below the bottom for the free flow of air outward and inward.

G is the outer or changing cylinder, formed at its upper portion also of considerable thickness, and chambered annularly, as indicated by *g*. Water also circulates through this chamber *g*. The lower portion is made of a single thickness of substantial material, as cast-iron, with a facing of plaster, G′. There is thin sheet-iron or other metal, $G^2$, to form the extreme inner surface of the lining G′.

The working-piston D is connected by a single piston-rod, *d*, working through an efficient stuffing-box at the top, to a cross-head connected by links to the beam M. The other end of this beam is similarly connected to the working-piston rod of another similar piston. I term these two sets of pistons, with their accompanying parts thus connected, an "engine." The beam is keyed to a strong "beam-center" or rocking shaft, *m*, on one end of which is keyed an inclined arm, M′, from a pin in the end of which the power is communicated by a link, N, to a crank-pin of a crank, O′, keyed to a revolving shaft, O, and equipped with an efficient fly-wheel or pulley, $O^2$, from which power is communicated, by belting or otherwise, to any machine which it is required to drive.

The annular changing-piston E has two small piston-rods, *e e*, working through stuffing-boxes at the top, each of which is connected by a link to a beam, P, which turns loosely on the beam-center *m*. The other end of each beam P is similarly connected to the opposite changing-piston. It follows that all the parts in the two cylinders balance each other.

The heater is designated by the letter B, additional marks of reference, as $B'$ $B^2$, being added when necessary to designate certain parts thereof. It is substantially dome-shaped on its under and inner side, $B'$, and cylindrical on its outer side, $B^2$, with a strong and wide flange, $B^3$, around the top, by which it is bolted to the expanded base of the outer cylinder, G. Between the dome-like interior and the cylindrical exterior is a limited space, which performs the important function of thoroughly heating the air to a high temperature in its rapid transference from the top to the bottom of the machine under the action of the changing-piston. The heater is braced, so as to effectually hold it in form in opposition to the forces tending to warp and destroy it under the high temperature to which it is subjected. This bracing consists of six webs, $B^4$, which are cast in one therewith, and firmly connect $B'$ and $B^2$, extending from the base to a level near the top of the heater.

H is a casting adapted to extend down in the six spaces between $B'$ and $B^2$ nearly to the bottom. It is divided from the bottom nearly to the top, to allow it to apply between the webs $B^4$. This casting leaves a thin space exterior to it between it and $B^2$, and a thin space next to its interior between it and $B'$. It need not fit tightly to the webs $B^4$; but it is important that it shall approximate thereto, so as to compel the main portions of the air to traverse down the entire depth of the heater and up again in its transfer back and forward from top to bottom of the engine. The air contained in the heater B and the connected spaces is compressed by a pump to a tension considerably above that of the atmosphere. The space in the bottom below the changing-piston E and below the working-piston D is marked *z*. It is kept in free communication through the thin but widely-extended spaces between the parts $B'$ and $B^2$ of the heater and a vertical cylindrical chamber, I, at one side, and a suitable top passage with the annular space *y* in the top of the engine above the annular changing-piston E. The thin space in the heater B is connected with the upright cylinder I by a chamber or connecting-passage, *g'*, which extends around in the base of the outer cylinder, G, as shown. As the changing-piston is shifted up and down it compels a portion of the compressed air in these spaces *y z* and in the connecting-passage *g'* to shift alternately from the bottom to the top of the apparatus. The bottom is hot. The top is as cool as it can well be maintained by all the facilities available.

F is the pump, worked by a rod, *f*, connected to an eccentric-strap, F', which is worked by an eccentric, $O^3$, on the main shaft O. This pump takes air from the atmosphere, and, compressing it to the required tension, forces it into a capacious tight receiver, (not shown,) which is kept full at a suitable pressure above atmosphere after the engine is stopped, ready to be availed of to charge the engine when required to start again. Suitable pipes and valves communicate from such receiver with the space above the working-pistons, from which the Dunbar packing allows it to pass down, as required, but not to return. Little is required after the engine is fully charged. The leakage is chiefly at the top around the stuffing-boxes. When the machine is working, this pump is or may be operated constantly, and compensates for leakages, and maintains the required high pressure of the air. A small safety-valve (not represented) is provided to discharge the air when the pressure rises too high.

The engine is, in its general features, analogous to that known as the "Stirling Engine." When, by the rise of the annular changing-piston, a large portion of the compressed air is transferred into the bottom space, *z*, it is expanded, and the effect is felt on the under face of the working-piston D, driving it forcibly upward. When, by the descent of the annular changing-piston, a large portion of the air is caused to move into the top of the engine, its pressure is reduced by cooling, and the working-piston D is allowed to descend against a reduced pressure. The space over the working-piston D is inoperative, and I provide for an equal pressure therein at all times. It is well that the pressure in such space shall be about equal to the lowest pressure below the working-piston—that is to say, if the pressure below the working-piston varies between sixty and ninety pounds per square inch, the air in the space above the working-piston should be always sixty pounds. The idle space over the working-piston is marked *x*. I extend it upward in a small annular chamber, *x'*, around the stuffing-box, which incloses the piston-rod *d*, and unite these portions of the two connected engines by a pipe, X.

As the working-piston in one of the two connected cylinders always descends when the other rises, the pressure of the compressed air on the upper surface of the two working-pistons is practically uniform in all conditions. I take care to provide a very efficient stuffing-box around the several piston-rods, so as to hold the compressed air efficiently with a minimum friction. The upper portion of the casing around the vertical cylindrical chamber I is chambered, as indicated by *i*. Water circulates through this chamber. The top is closed by a removable bonnet, I'. This also is chambered, as indicated by *i' i²*. These two chambers in the bonnet are kept filled with cold water, and are divided by a continuous partition.

Within the upright cylinder I are two pieces of apparatus which perform important functions. When the bonnet I' is taken off, both may be taken out and repaired or exchanged by simply raising and lowering through the open top. The lowermost, J, is a regenerator, the function of which is to alternately absorb heat from the air and give it off again, as will be more fully explained further on. The uppermost, K, is a cooler for absorbing and conveying away heat. It is of cylindrical form, pretty closely filling the interior of the cylinder I. All the surfaces of this cooler are made tight and strong. Two pipes, K′ K², connect it with the chambers $i'$ $i^2$, respectively, in the bonnet. Small thin pipes $k$ are provided, extending from end to end through this cooler. The air, in its rapid transfer in one direction and the other between the chambers $y$ and $z$, moves through these tubes $k$ and is cooled by the cold water around them. A pipe, L, brings cold water from a pump or other supply source into the chamber $i'$. A passage, $i^3$, leads the water away from the chamber $i^2$ into the space $i$, which surrounds the chamber I. This latter chamber is in free communication with the chamber $g$, which extends around near the upper portion of the changing-cylinder G. A passage, $c'$, (seen at the top of the cylinder,) leads the water into the chamber $c$. After circulating around the working-cylinder, the water escapes through a passage, $c^2$, into a discharging-pipe, Q. The inner end of the passage $c^2$ receives water through a pipe, which extends down nearly to the base of the annular chamber $c$. This and the arrangement generally compel a complete circulation of the water in one continuous stream through the proper spaces in and around the upper portion of the engine. The effect is to absorb and carry away the heat which creeps up to the upper portion of the apparatus.

The regenerator J is formed of two sheets of thin brass or other metal—one corrugated and the other plain—wound tightly together around a central rod until it is as large as the chamber I will receive. It is held tightly by fine wires bound around, or by other suitable means. The air in its alternate transfer between the upper and lower ends of the apparatus moves through the spaces between these plates. In coming up from below it heats the lower parts of J and emerges greatly cooled at the top, and the small amount of remaining heat in the air is abstracted by the cooler K. The air on its return through the regenerator J takes up the heat which it before left in the plates, and it consequently emerges from the lower end of J already heated nearly to the required degree, and needs only a little more heat to be added by the heater B to give it the full temperature necessary to induce the required tension. The motion of the changing-piston does not add to but subtracts from the total power. This loss is slight, because the pressure is always substantially equal above and below. It requires merely sufficient power from the other working parts of the engine to overcome the friction and inertia. The changing-pistons are operated by means of what is commonly known as a "link-motion." It allows the engine to be reversed.

Referring to Figs. 1, 2, and 3, W is the link. It is worked by two eccentric-rods, W W′, connected to straps which inclose eccentrics O⁴ O⁴, properly keyed on the shaft O. The link is shifted by a hand-lever, W², connected in the ordinary manner.

V is a stout rocking shaft having an arm, with a link-block, V², which is moved by the link W. Two arms, V³ V³, keyed on the rocking shaft V, connect by links V⁴ to pins on the respective beams P P, to which the changing-piston E is connected. The link thus employed serves to reverse the action by shifting the lever W², and consequently the link W³, so that the link-block V² is shifted completely from one end of the link W to the other end thereof. It is also practicable by this mechanism to stop or reduce the action of the engine without reversing it, as follows: The efficiency of the engine depends on the shifting of the air from one end to the other by the action of the changing-piston E. I have until now described the motion of this changing-piston as being always complete—that is to say, making the whole stroke which the length of the changing-cylinder will allow. This will occur when the link W is shifted to either extreme position, and should be done when the full working-power of the engine is required; but when less than the full power is required the adjustment of the link secures ready control of the power. It is only necessary to ship the lever W², and consequently the link W, into some intermediate position, so that the link-block V² will be held not at either extreme end of the link. When it is desired to stop the engine altogether, the lever W² should be placed in such position that the link-block V² will be held near the middle of the link W. The main portions of the two engines are counterparts of each other. The arms M′ of the respective beam-centers $m$ work in such positions that their respective links N engage with cranks O′, lying in the same plane. One is in the position for operating on the crank with its full force while the other is passing its dead-point. By reason of this arrangement, the two engines combined work with a continuous and nearly uniform action, requiring a fly-wheel, O², of only moderate size and weight. The fly-wheel can be dispensed with entirely for some uses, as for propelling vessels.

It will be seen that the hot products of combustion, rising from the furnace through the funnel A², bathe the entire dome-like interior of the heater B, and, descending, move outward and thence upward, bathing the exterior of the heater. They are finally discharged through the passage $a$ into a chamber, $a'$, in which they descend, and thence pass by slight lateral movement into a parallel chamber, $a^2$, in which they rise, and ultimately are discharged through a horizontal flue, $a^3$. They thence pass by a suitable connecting-passage, $a^4$, into a stack, $a^5$. (See Fig. 2.) The fresh air to support combustion in the furnace is led through a series of inverted-U-shaped pipes, S, extending through the chambers $a'$ $a^2$, as clearly shown in Fig. 4. The motion of the fresh air is indicated by short arrows. The motion of the hot gaseous products of combustion is indicated by long arrows with round heads. The hot gases flow from the furnace through the passage *a* at a high temperature. In descending in the chamber *a'* they heat that portion of the pipes S and become themselves partially cooled. In subsequently rising in the chamber $a^2$ they come in contact with cooler portions of the pipes S, which have just received fresh cold air from the atmosphere outside. The products of combustion impart still more of their heat to the air-pipes in this passage, and finally flow away to the stack with their spent heat largely utilized by being transferred to the air which is destined to support combustion in the furnace.

R is a damper turning on an axis, *r*, and actuated by an arm or lever, R'. This damper exercises a controlling influence on the draft of air through the furnace, and consequently on the intensity of the heat supplied to the heater. It is important to maintain the heat sufficiently high to make the engine efficient and also to avoid burning the metal. In other words, it is important to keep the temperature of the gases discharged through the flue *a* nearly uniform. I attain this by working the damper automatically.

The arrangement of the damper in Fig. 4 is slightly modified from that in the other figures, but will be readily understood.

T is a hollow spheroidal casting filled with mercury or other fluid having a high boiling-point, connected by a pipe with a chamber under a flexible diaphragm, U. This diaphragm is loaded by the weight U', and connected by the rod $R^2$ to the lever R' of the damper through the movable block $R^3$, fixed in any desired position on the arm or lever R' by the screw $R^4$. When from any cause the temperature of the gases in the flue *a* rises too high, the mercury in T commences to boil, and the mercury-vapor, pressing on the surface, drives the mercury down and raises the diaphragm U, thereby closing the damper R. When the temperature falls sufficiently, all the mercury-vapor condenses again and the diaphragm U sinks, opening the damper. When the apparatus works properly, it keeps the damper always partially shut, closing it tighter or opening it farther by the action of the mercury, as required, so that the temperature of the gases in the flue *a* is kept nearly uniform. These features, however, will be made the subject-matter of a separate application. I employ a thick mass of ashes or other good non-conducting material around the bases of the several parts of the apparatus above the brick-work A, and held by an exterior case of metal or other suitable material. If the regenerator is removed and the air allowed to flow from the cooler directly into the heater, the escaping products of combustion can be reduced to some 300° or 400°; but if the regenerator is in use the air is delivered into the heater at about 500°; and as there must be a difference of temperature of some 200° between the air inside the heater and the gases outside in order to effect a rapid transfer of heat, the gases will pass away at some 700°, involving a loss of one-third of the efficiency of the fuel. Under these circumstances the efficacy of the economizer-pipes becomes apparent, as by them at least one-half the escaping heat is returned to the furnace, and a high degree of efficiency secured. The part which fails first in ordinary usage is the heater B. This portion, being exposed to intense heat, becomes partially oxidized or burned, while the rest of the engine remains in good condition.

It is important to be able to replace the heater without disturbing the main portion of the engine. I support the engine at the mid-height, so as to allow the lower portions to expand and contract with heat and cold without inducing any movement of the upper portion. This also relieves the lower portion largely from strain.

Y Y are stiff girders of cast-iron or other suitable material supported at each end by good bearings on walls Z, of masonry. The compound cylinders are provided with stiffly-braced flanges, which are bolted upon these girders.

The furnace is suspended in a sufficiently stout casing or box of boiler-iron or other suitable material, as indicated by Y'. (See Fig. 4.) This I equip at the top with means for making a tight and strong connection to the bases of the compound cylinders above. The fire-box and its contents are thus suspended from the girders Y. Within the box Y', I arrange the fire-brick lining A, with its arched top A' and short chimney or funnel $A^2$, and suitable grates, &c. The furnace and ash-pit doors are hinged on a casing, Y'. Its front may be doubled or tripled to protect the workmen from heat. The grate-bars are separate bars of hard iron or steel, to be turned over from time to time. I can use water-grates, if preferred in any case. The furnace-casing Y is just large enough to hold the heater and necessary brick-work without regard to the size of the foundation, except that it must have room between the walls Z. The heater is secured to the top of the furnace-casing, and to apply it in place the whole is slid under the compound cylinder C G, and the heater-bolts are screwed up. The entire furnace, with its inclosing-case, is thus suspended in its place.

I completely separate the fire-room, which surrounds or is adjacent to the lower portion, from the engine-room, which surrounds or is adjacent to the upper portion. I accomplish this by constructing a horizontal partition, *y'*, at or near the level of the girders Y. All the hottest portions are below this. The horizontal partition *y'* serves as a floor for the engine-room, which contains the machinery above it, and as a means for protecting the machinery from the heat due to the fire below. It cuts off the heat, noise, dust, and ashes, which are annoyances in an engine-room.

All the parts not fully represented or described may be of any ordinary or suitable description.

Modifications may be made in the forms and proportions of the details. I can vary the proportions of the diameter to the stroke. I can increase the length of the arms M′, correspondingly increasing the throw of the cranks O′. This will have an effect on the relations of the two engines to each other. It is well to so proportion the parts as to bring the effect of the respective links N of the two engines about "quartering" to each other. I can extend the cooling-bath of water farther down on the respective cylinders. I can extend the non-conducting envelope farther up.

Instead of the solid webs $B^4$, I can use hollow stays forming an open communication between the interior and exterior of the heater, taking care to make these passages so small that a large portion of the gases will still be required to descend and pass under the bottom rim of the heater. Such would increase the heating-surfaces, and may be desirable in some instances in large engines. Such flues should be of much greater vertical than horizontal dimensions. They should be narrow gaps extending up and down at certain points along the periphery of the heater. I can make such gaps extend quite down to the bottom rim of the heater, so as to form the lower portion of the heater in a number of separate sections or flattened pipes, always taking care to form the base-castings H with corresponding divisions a little narrower than the space in which they are to fit, so that they can be easily inserted and removed. Series of cylindrical or nearly cylindrical pipes may be provided instead of flat sections, taking care to always provide a proper dividing-piece in each pipe, extending nearly to the bottom. Such pipes may be screwed or secured by any ordinary or suitable means in a continuous ring above; but I prefer the continuous dome, simply divided with webs, as shown. I can make the cylinders C G each in one continuous length; but it is better to make them in two or more separate lengths, properly joined, and having a packing of asbestus or other non-conducting material in the joints. This greatly retards the conduction of heat from the hot to the cold end.

Some of the advantages due to certain features of the invention may be separately enumerated, as follows:

First. By reason of the inner cylinder, C, being finished on both its outer and inner surfaces and equipped with a water-tight chamber extending around in its upper portion, with suitable connections for circulating water, I provide a cylindrical surface for the exterior of the inner piston, D, and for the interior of the outer annular piston, E, both under favorable conditions for stability and coolness.

Second. By reason of the connections between the baths of water in the upper portions of the outer cylinder, G, and chamber I, and also the inner cylinder, C, a single current of water is made efficient to cool the upper portions of the entire apparatus, as herein specified.

Third. By reason of the construction of the double inner cylinder, C, with its upper portion, of cast metal, filled with water, and its lower portion, of sheet metal, filled with a non-conducting material, the structure conducts upward little heat, and is adapted to serve for a bearing for the packings on the outer and inner sides, so far as the packings of the two pistons move, and to serve merely as a wall approximately fitting the piston in the lower portion.

Fourth. By reason of the fact that the outer cylinder, G, is of thick cast metal at the upper portion, with water circulating in an ample chamber therein, and that the lower portion is made thinner, the thickness being filled out with plaster, as shown, I am able to strongly support the parts, and to maintain a suitable surface, and to avoid the transmission of much heat upward through the material.

Fifth. By reason of the beams P P and M, engaged by links to the respective piston-rods *d* and *e e*, with their proper cross-heads, as shown, I am able to communicate the power efficiently from the working-piston D to the continuously-revolving shaft O and the annular changing-pistons E, and to guide the several cross-heads by a few slides.

Sixth. By reason of the arrangement of the regenerator J in a passage, I, outside of both pistons D and E, I am able to make the passage large and deep, and to employ a regenerator of any desired size and weight.

Seventh. By reason of the removable bonnet I′ over the regenerator-passage I and the arrangement of the cooler K and regenerator J, so as to provide for easy removal and insertion, I, am able to greatly facilitate examination, cleaning, and repairs.

Eighth. By reason of the passage *g* being above the heater B, I am able to maintain the continuity of the metal of the heater and allow all required amounts of expansion and contraction of the heater below without injury.

Ninth. By reason of the connection X between the upper portions of the two working-cylinders above the top of the changing-cylinders, I am able to allow a free transmission of the compressed air between the tops of the working-cylinders, respectively, without interfering with the action of the changing-pistons.

Tenth. By reason of the link W and its connections for operating the changing-pistons, I am able to vary the extent of motion of the changing-pistons so as to make them perform their full strokes or various lesser strokes, and thus to vary the power and regulate the action so as to maintain uniform speed, and am able, also, to conveniently change the relations of their motions to those of the working-piston, so as to reverse the engine when desired.

Eleventh. By reason of the two sets of working-pistons and their connections, operating, as shown, on a single shaft, O, located between the cylinders G G, I avoid dead-points, Twelfth. By reason of the fact that the entire structure is supported on the cross girders Y above the heaters, and that the heaters are suspended therefrom with liberty to expand and contract freely, the heated parts are relieved from strain, and the machinery above works in more exact positions.

Thirteenth. By reason of the rigid support of the cross-girders Y on parallel walls Z, with a clear passage between, I am able to more conveniently remove and replace a heater when necessary.

Fourteenth. By reason of the tight horizontal partition or flooring $y'$, I defend the working parts of the engine from the heat and dust due to the fire below.

Fifteenth. By reason of the webs $B^4$ connecting the inner and outer shells of the heater, combined with a base-casting, H, formed in corresponding divisions, I am able, by means easily removable and accessible, to stiffly support and increase the durability of the heater, and also compel the air to traverse in the thin space along the whole inner surface of the heater.

Sixteenth. By reason of the fact that the heater B, which requires to be very hot, and necessitates the discharge of the gases at a high temperature, is combined with the pipes S, conducting the fresh air to the ash-pit through the escaping gaseous products of combustion, I am able to return a large portion of the heat of such gases to the furnace, and to discharge the gases into the stack at an economical temperature.

Seventeenth. By reason of the combination, in an air-engine, of the economizer-tubes S, for restoring to the furnace the heat in the escaping gases, with the regenerator J, for restoring to the compressed air on its return a portion of the heat with which it left the heater, I realize the economy due to both these provisions, and am able to procure a highly efficient, compact, and reliable engine.

Eighteenth. By reason of the casing Y′ inclosing the entire furnace, with its brick-work, grates, &c., I am able, by simply removing the heater-bolts and lowering the casing from its connection with the girders Y, to remove the entire furnace for repairs or exchange and to replace it with little labor or skill. The heater is, with all the precautions, shorter lived than the other parts. This facilitates the repairs and changes required.

I claim as my invention—

1. In a hot-air engine, the inner cylinder, C, [illegible]ished on both its inner and outer surfaces with means, substantially as described, for circulating a current of water in the upper portion thereof, in combination with the inner piston, D, and annular outer piston, E, as herein specified.

2. In a hot-air engine, the inner cylinder, C, and outer cylinder, G, having means, substantially as described, for circulating a single current of water through both cylinders C and G, in combination with each other and with the inner piston, D, and annular piston E, as herein specified.

3. In a hot-air engine, the cylinder C between the working-piston and the changing-piston, constructed with double cast-metal water-chambers in the upper part, and a double sheet-metal chamber inclosing a non-conductor in the lower part, substantially as herein specified.

4. In a hot-air engine, the cylinder G, having its upper portion of cast metal in two thicknesses, forming a chamber adapted to receive a current of water, and its lower portion of less thickness, faced with a rigid non-conducting material, as herein specified.

5. In a hot-air engine, the inner cylinder, C, and outer cylinder, G, inner piston, D, with its rod *d*, and annular piston E, with its rods *e e*, in combination with each other, and with slides and suitable cross-heads, and with links connecting these cross-heads to cranks mounted oppositely on the shaft O, as herein specified.

6. In a hot-air engine, in combination with the working-piston D and changing-piston E, the regenerator J, mounted in a passage, I, outside of both, substantially as herein specified.

7. In a hot-air engine, the regenerator J and cooler K, in combination with each other, and with the passage I and removable bonnet I′, adapted to allow their ready removal, and with the working-piston D and annular piston E, mounted concentrically in suitable cylinders, as herein specified.

8. In a hot-air engine, the changing-cylinder G, having a passage, $g'$, extending around above the heater, and forming a connection between the bottom space, *z*, connected through the thin space in the heater B, and the upper space, *y*, connected through the cylinder or passage H, as herein specified.

9. In a hot-air engine, the working-pistons D D, connected to the same beam, M, in combination with the cylinder C C therefor, and the two annular changing-pistons E E, with the inclosing-cylinders G, concentric to C, and having a connecting-passage, X, between the upper portion of the working-cylinders, for the rapid and easy transfer of the air above the piston, as herein specified.

10. In a hot-air engine, the link W, with its rods $W'$ $W^2$, operated as shown, in combination with the block $V^2$ and suitable mechanical connections to a changing-piston, E, arranged to serve as herein specified.

11. In a hot-air engine, the combination of two pairs of working-pistons, with their respective working means M′ M′ and links N N, arranged to act on the shaft O′, located between the cylinders G G, as herein specified.

12. The heater B and cylinder C, in combination with each other and with the girders Y, arranged to relieve the heated parts from strain, as herein specified.

13. The cross-girders Y, in combination with the heaters B and cylinders C and their several attachments, and with supporting-walls Z, arranged to present a clear passage between the latter, substantially as herein specified.

14. The partition $y'$, arranged relatively to the furnace and to the working parts of the engine, substantially as herein specified.

15. The webs or stays $B^4$, connecting the inner shell, B′, with the outer shell, $B^2$, of the heater, in combination with a base-casting, H, formed with corresponding divisions, as herein described.

16. In combination with the heater B of a hot air-engine, the air-heating pipes S, conducting through the escaping hot gases the air to support the combustion in the furnace, substantially as herein specified.

17. The economizer S, for returning to the furnace a portion of the heat in the gases escaping therefrom, and the regenerator J, for the alternately absorbing and giving out of heat in the compressed air, in combination with each other and with the working parts of an air-engine, arranged for joint operation as herein specified.

18. In a hot-air engine, the casing Y′, inclosing the furnace and making the whole conveniently portable, in combination with means, Y, for supporting the engine by its upper portion, as herein specified.

In testimony whereof I have hereunto set my hand, at New York city, New York, in the presence of two subscribing witnesses.

STEPHEN WILCOX.

Witnesses:
J. E. RENWEE,
M. F. BOYLE.

THE ECKERT LITHOGRAPHING CO., WASHINGTON, D. C.